United States Patent Office 3,056,170
Patented Oct. 2, 1962

3,056,170
PROCESS FOR PREPARING POLYMERIC STRUCTURES
Robert W. Hendricks, Circleville, Ohio, and Kenton Revay Osborn, Grand Island, N.Y., assignors to E. I. du Pont de Nemours and Company, Wilmington, Del., a corporation of Delaware
Filed Jan. 18, 1962, Ser. No. 165,731
32 Claims. (Cl. 18—57)

This invention relates to the preparation of shaped structures of acrylonitrile polymers. More particularly, it relates to a process for forming highly oriented, tough films of polyacrylonitrile.

In the production of most polymeric films, orientation, particularly that obtained by elongating the film biaxially, provides a significant improvement in the physical properties of the film. Elongating is usually performed on the film in a special apparatus for rolling or stretching. Attempts to apply this known technology to polyacrylonitrile film has met with substantially no success. When biaxially elongated to the extent necessary for any significant improvement in properties, polyacrylonitrile films tend to fibrillate excessively.

An object of the present invention is a process for producing acrylonitrile polymeric structures having improved properties. A further object is a process for producing tough oriented polyacrylonitrile film without fibrillating the film. Other objects will appear hereinafter.

Figure 1:
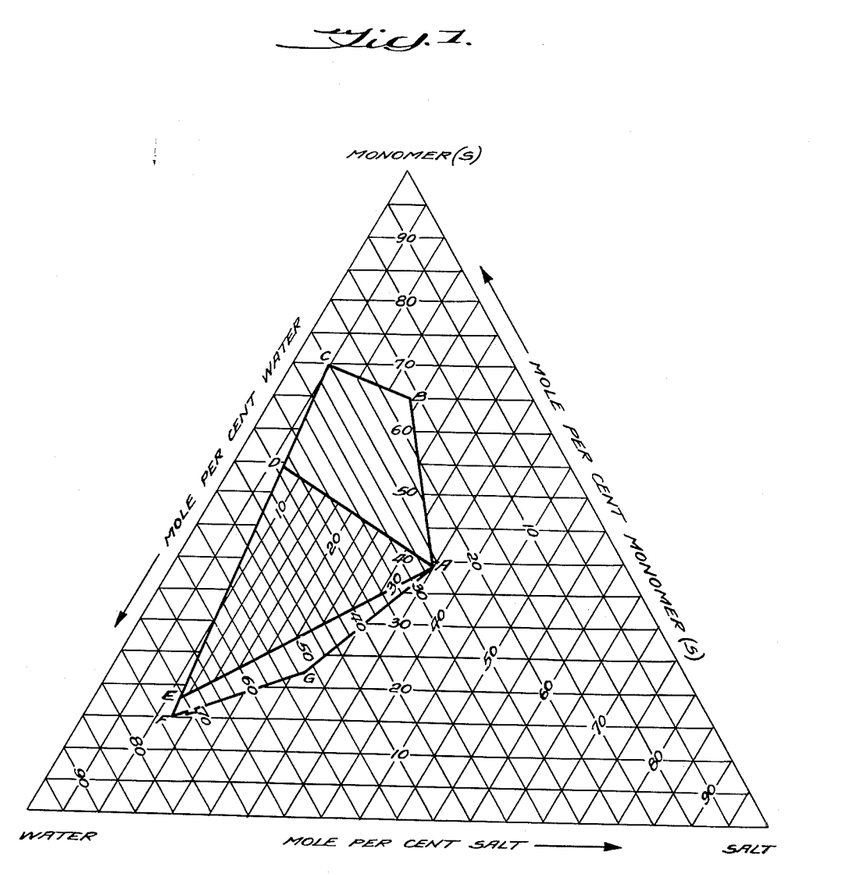
Figure 2:
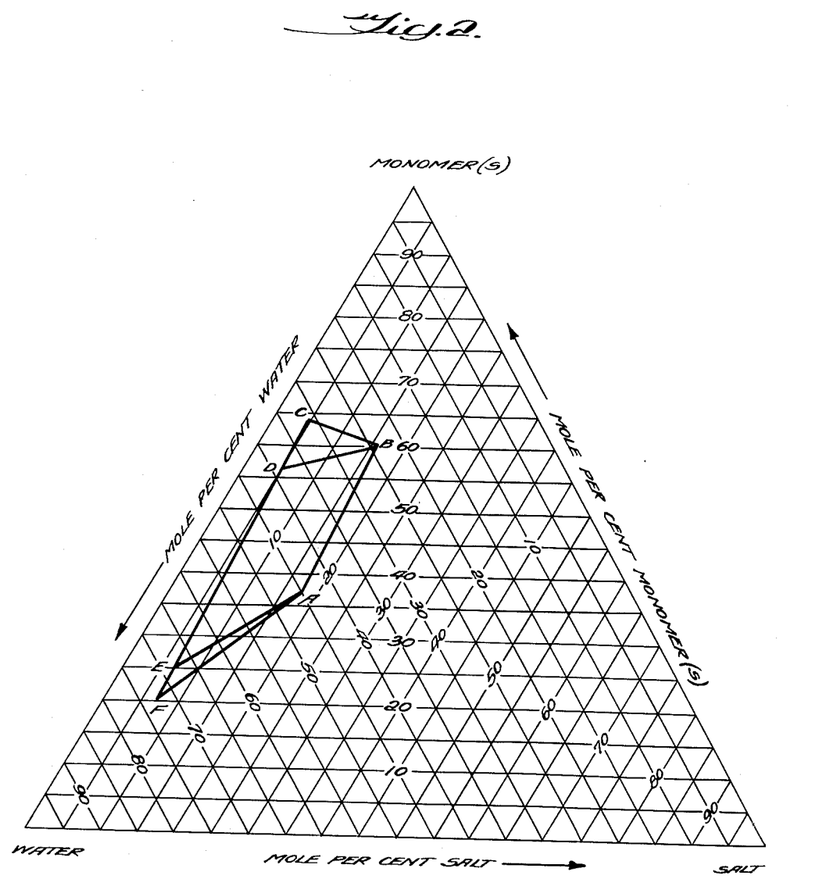
Figure 3:
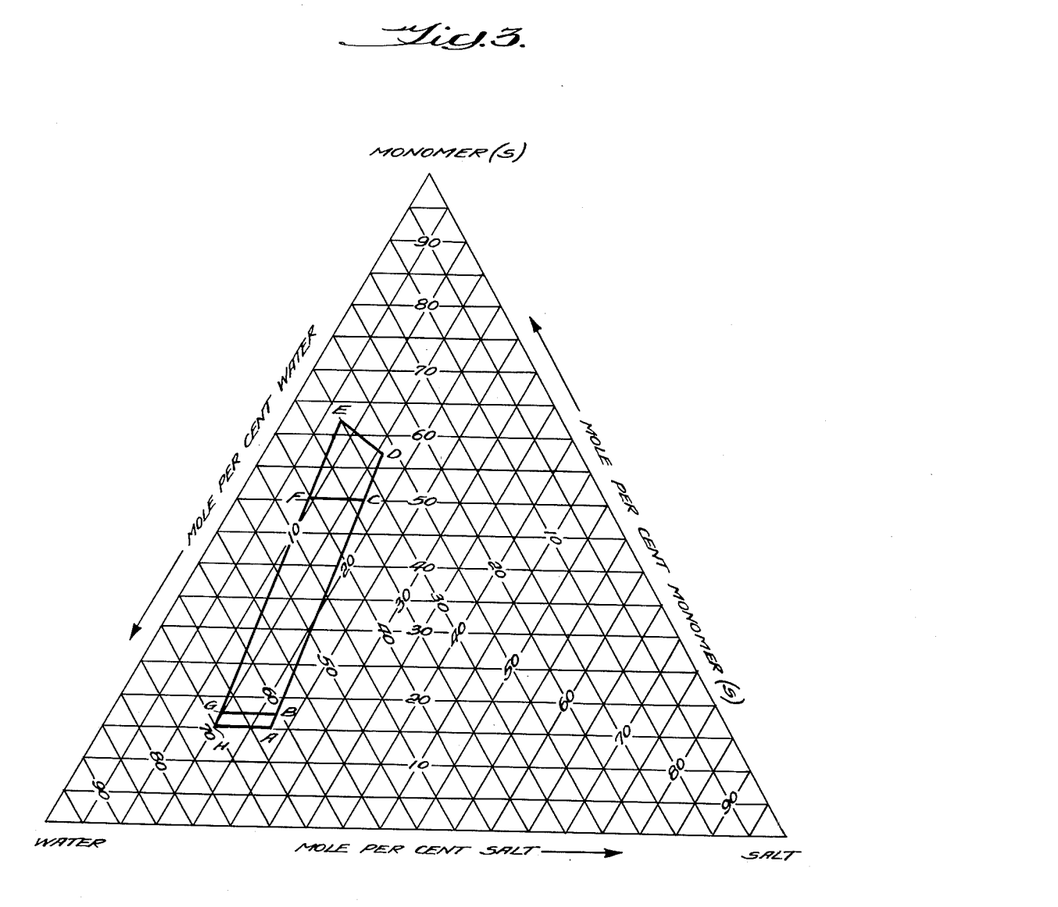

The invented process comprises the steps of mixing three essential ingredients, critical mole percentages of at least one polymerizable monomer, 75–100% of said monomer being acrylonitrile, critical mole percentages of selected metal salts, and critical mole percentages of water, each of the percentages of said essential ingredients falling within one of the curves defined by ABCDEFG of FIGURE 1, ABCDEF of FIGURE 2, or ABCDEFGH of FIGURE 3, preferably within one of the curves defined by ADE of FIGURE 1, ABDE of FIGURE 2 or BCFG of FIGURE 3; polymerizing said monomer in said mixture to form a salt-containing polymer; shaping said polymer into a structure, preferably into a self-supporting film; completing polymerization if necessary; elongating said structure in at least one direction, preferably elongating the self-suporting film at least 1.5× in two mutually perpendicular directions; washing, preferably with water, the elongated structure essentially free of the salt while holding said structure under tension; and, thereafter, drying the structure while holding it under tension, preferably at a temperature above 90° C.

The invented process also comprises the steps of mixing three essential ingredients, 15–70 mole percent of at least one polymerizable monomer, 75–100% of said monomer being acrylonitrile, 5–35 mole percent of a halide selected from the group consisting of chlorides, bromides and iodides of calcium, zinc, strontium and cadmium, and bromides and iodides of lithium, sodium and potassium, preferably the zinc chloride or bromide, and 17–73 mole percent water, each of the percentages of said essential ingredients falling within the curve defined by ABCDEFG of FIGURE 1, preferably within the curve defined by ADE of FIGURE 1; polymerizing said monomer in said mixture to form a halide-containing polymer; shaping said polymer into a structure, preferably into a self-supporting film; completing polymerization if necessary; elongating said structure in at least one direction, preferably elongating the self-supporting film at least 1.5× in two mutually perpendicular directions; washing, preferably with water, the elongated structure essentially free of the halide while holding said structure under tension; and, thereafter, drying the structure while holding it under tension, preferably at a temperature above 90° C.

The invented process also comprises the steps of mixing three essential ingredients, 20–64 mole percent of at least one polymerizable monomer 75–100% of said monomer being acrylonitrile, 5–18.5 mole percent of calcium thiocyanate and 24–73 mole percent water, each of the percentages of said essential ingredients falling within the curve defined by ABCDEF of FIGURE 2, preferably within the curve defined by ABDE of FIGURE 2; polymerizing said monomer in said mixture to form a calcium thiocyanate-containing polymer; shaping said polymer into a structure, preferably into a self-supporting film; completing polymerization if necessary; elongating said structure in at least one direction, preferably elongating the self-supporting film at least 1.5× in two mutually perpendicular directions; washing, preferably with water, the elongated structure essentially free of calcium thiocyanate while holding said structure under tension; and, thereafter, drying the structure while holding it under tension, preferably at a temperature above 90° C.

The invented process also comprises the steps of mixing three essential ingredients, 15–62 mole percent of at least one polymerizable monomer 75–100% of said monomer being acrylonitrile, 8–23 mole percent of an alkali metal thiocyanate selected from the group consisting of lithium thiocyanate, sodium thiocyanate and potassium thiocyanate, preferably the sodium thiocyanate, and 27.5–70 mole percent water, each of the percentages of said essential ingredients falling within the curve defined by ABCDEFGH of FIGURE 3, preferably within the curve defined by BCFG of FIGURE 3; polymerizing said monomer in said mixture to form an alkali metal thiocyanate-containing polymer; shaping said polymer into a structure, preferably into a self-supporting film; completing polymerization if necessary; elongating said structure in at least one direction, preferably elongating the self-supporting film at least 1.5× in two mutually perpendicular directions; washing, preferably with water, the elongated structure essentially free of the thiocyanate while holding said structure under tension; and, thereafter, drying the structure while holding it under tension, preferably at a temperature above 90° C.

This process, which is of particular significance when applied to the formation of highly oriented polymeric films, requires certain steps which steps were contrary to anything known heretofore in the prior art. Surprisingly, orientation that cannot be imparted without adversely affecting a pure acrylonitrile-containing polymeric film, can be imparted to such a film containing the metal salt. Furthermore, this orientation is not lost to any significant extent by washing out the metal salt.

Figure 4:
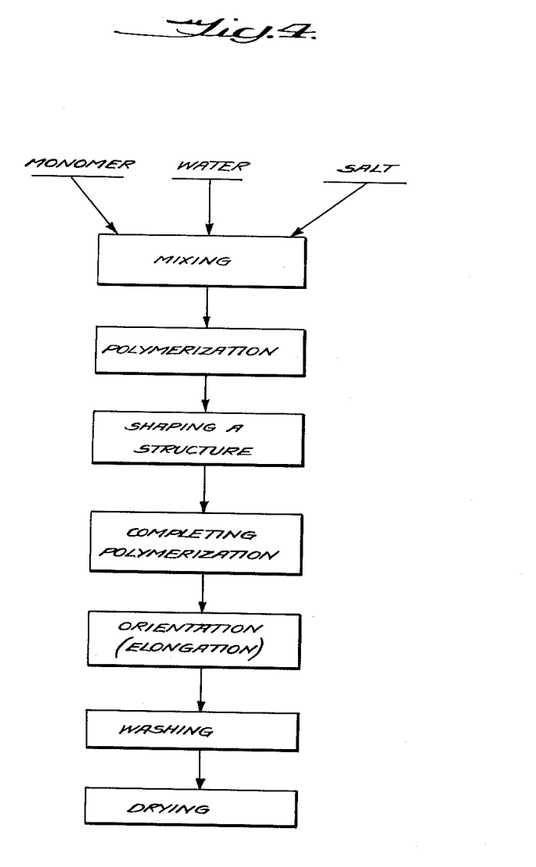

The critical steps required to produce these results are schematically illustrated in FIGURE 4 and will be discussed in subsequent sections under the following headings:

(1) Mixing essential ingredients.
(2) Polymerization.
(3) Shaping a structure.
(4) Completing polymerization.
(5) Orientation.
(6) Washing.
(7) Drying.

MIXING ESSENTIAL INGREDIENTS

The three essential ingredients—monomer/water/metal salt—must be mixed together in such proportions as to form a homogeneous or single-phase system at substantially room temperature. Furthermore, the composition must be such that the homogeneous polymeric structure formed by polymerizing the mixture is orientable. "Orientable" is defined as capable of being stretched 4× (300%) at a temperature no higher than 30° C.

The compositions operable in the present process fall within the area ABCDEFG of FIGURE 1, area ABCDEF of FIGURE 2 and area ABCDEFGH of FIGURE 3. The points defining the area of FIGURE 1 correspond to the following mole percentages of monomer/salt/water:

A—39/35/26
B—65/18/17
C—70/5/25
D—54/7/39
E—17/11/72
F—15/12/73
G—22/26/52

The points defining the area of FIGURE 2 correspond to the following mole percentages of monomer/salt/water:

A—36.5/18.5/45
B—60/16/24
C—64/5/31
D—56/5.5/38.5
E—24/7/69
F—20/7/73

The points defining the area of FIGURE 3 correspond to the following mole percentages of monomer/salt/water:

A—15/23/62
B—17/22.5/60.5
C—50/17/33
D—57/15.5/27.5
E—62/8/30
F—50/9.5/40.5
G—17/14.5/68.5
H—15/15/70

In referring to the proportions of the components, it should be understood that the sum of the mole percentages of each of the three components will add up to 100 mole percent. The content of additional ingredients present in minor amounts, such as a photoinitiator and/or an acid shown in several of the subsequent examples, are neglected.

While all compositions resulting in polymerized salt-containing films which are orientable in the present sense, i.e., those having tensile elongations of at least 300% (4×), are found to have utility in the preparation of biaxially stretched films, the compositions which provide polymerized salt-containing films having tensile elongations between 400% (5×) and 900% (10×) offer special advantages in the preparation of highly oriented, biaxially stretched films, and are therefore preferred for use in this invention. These salt-containing films, in addition to having the ability to be stretched to an extent of at least 2.0× in each of two mutually perpendicular directions with an accompanying high orientation efficiency during stretching, also have a high level of toughness, as indicated, for example, by relatively high tensile strengths, which tends to facilitate the continuous high speed operation desired in a commercial process. The areas within which such preferred compositions fall are given on FIGURE 1 by the area ADE, on FIGURE 2 by the area ABDE and on FIGURE 3 by the area BCFG. The points defining the area of FIGURE 1 correspond to the following mole percentages of monomer/salt/water:

A—39/35/26
D—54/7/39
E—17/11/72

The points defining the area of FIGURE 2 correspond to the following mole percentages of monomer/salt/water:

A—36.5/18.5/45
B—60/16/24
D—56/5.5/38.5
E—24/7/69

The points defining the area of FIGURE 3 correspond to the following mole percentages of monomer/salt/water:

B—17/22.5/60.5
C—50/17/33
F—50/9.5/40.5
G—17/14.5/68.5

It should be emphasized that the composition limits shown for the various salts all relate to the characteristics of the resulting mixtures, both before and after polymerization, at essentially room temperature. Since the relative solubilities of the essential components as well as the mechanical properties of the resulting polymeric films (related to orientability) are somewhat temperature sensitive, it will be recognized that at somewhat elevated temperatures or lowered temperatures the operable composition limits both before and after polymerization will be somewhat different than shown on the figure. Within the range from about 0 to 50° C., these differences are relatively small, however, and operating within this temperature range may be considered to be included explicitly within the scope of this invention.

The most critical aspect of the composition limits on monomer, water and salt which are polymerized to form the homogeneous salt-containing structure is that the film be orientable at substantially room temperature, as hereinbefore defined. It is possible to prepare various homogeneous salt-containing films which are not orientable in the present sense merely by adjusting the composition of the mixture to be polymerized prior to polymerization. It would thereafter, of course, be possible to readjust the composition prior to the orientation step in order to effect conversion to an orientable structure, for example; by changing the water content of the coalesced structure, by aging the structure in an atmosphere of suitable humidity. Alternatively, a coalesced film falling outside of the critical composition area could be converted to a film of the proper composition for orientation by immersing the film briefly in a bath of aqueous solvent metal salt solution of suitable concentration and temperature. While such variations are obviously less convenient than operating according to the direct preferred mode as herein described, they might be used if desired without departing from the spirit of this invention.

In the present invention the monomeric polymerizable component necessarily comprises at least 75%, and preferably at least 85% acrylonitrile. Other monomeric polymerizable compounds containing ethylenic unsaturation, and which are copolymerizable with acrylonitrile may be added to the monomeric acrylonitrile component. Examples of ethylenically unsaturated monomers copolymerizable with acrylonitrile include the acrylates and alkacrylates, such as methyl acrylate, ethyl acrylate, butyl acrylate, 2-ethylhexyl acrylate, methyl methacrylate, butyl methacrylate, hexyl methacrylate, etc.; vinyl chloride, vinyl acetate, vinylidene chloride, styrene, and compounds selected from the class consisting of vinyl arene sulfonic acids and their water-soluble salts, N-vinylpyrollidone, 2-methyl-5-vinylpyridine and other monomers disclosed in U.S. Patents 2,436,926 and 2,456,360.

The process of this invention will be described in some detail with respect to the use of zinc chloride, sodium thiocyanate and calcium thiocyanate solvent metal salts. It should be emphasized, however, that other metal halides of group I and group II metals, or other alkali metal thiocyanates, which when dissolved in water, form solutions capable of dissolving polymers of acrylonitrile, or which are miscible to a sufficiently high degree with acrylonitrile monomer, may also be employed in the process of this invention. Additional salts are illustrated in the examples. These metal salts should be sufficiently soluble in water to yield 10% solutions, and preferably at least 30% solutions. Furthermore, concentrated aqueous solutions of the salts must be capable of dissolving the subject polymers of acrylonitrile at preferably moderate temperatures, e.g., within the range of 0–75° C. and preferably below 40° C. in order to minimize possible undesired evaporation of monomer, bubbling, etc., prior to complete polymerization.

The solubility of the polymer in a concentrated aqueous solution of the solvent metal salt may be determined by placing 0.1 gram of the finely divided polymer in 10 ml. of concentrated aqueous salt solution and stirring the mixture with heating, if necessary, and observing whether the polymer balls up to a coherent mass and/or passes into solution. Soluble, low molecular weight polymers tend to pass rapidly into solution, while soluble high molecular weight polymers absorb the salt solution and coalesce before slowly passing into solution.

A further test of the suitability of the metal salt is derived from the fact that it has been found that the solvent power of the metal salt is related to its ability to complex with the nitrile groups attached to the acrylonitrile polymer chain. A similar interaction is also found with acrylonitrile monomer. This interaction manifests itself by a characteristic band shift in the infrared absorption spectrum of acrylonitrile or acrylonitrile polymers in the presence of these solvent metal salts, which effect can thus be used to identify the operable salts.

It is well known that compounds containing the nitrile group exhibit an absorption band in the four to five micron wavelength range which is characteristic of this group, corresponding to the fundamental stretching vibration of the nitrile group. In pure acrylonitrile monomer, the center of this band occurs at a frequency of 2226 cm.$^{-1}$ (corresponding to a wavelength of 4.49 microns) while for pure acrylonitrile polymers the band center occurs at 2242 cm.$^{-1}$ (corresponding to a wavelength of 4.45 microns). It is found that the addition of a solvent metal salt which is suitable for use in this invention causes the appearance in this spectral region of a second characteristic absorption band at higher frequencies or shorter wavelengths than those given above. This second band corresponds to the absorption due to nitrile groups which are complexed with the solvent metal salt. For example, in the presence of zinc chloride, acrylonitrile monomer has a new absorption band at 2264 cm.$^{-1}$ while acrylonitrile polymer shows a new band at 2277 cm.$^{-1}$, corresponding to a frequency shift, or band shift, of 35 cm.$^{-1}$ for both the monomer and the polymer. The intensity ratio of the two bands in question is essentially a measure of the relative numbers of complexed and non-complexed nitrile groups, and is dependent upon the solvent metal salt concentration, to substantially the same extent in both polymer and monomer systems. The addition of water is found to weaken the intensity of the second, shifted band, indicating a decrease in the number of complexed nitrile groups. Within the range of compositions of monomer (or polymer)/salt/water which are operable for use in the process of this invention, the presence of the second band is readily detected, however. Where essentially no water is present in high salt-content systems, the original band due to uncomplexed nitrile groups may even be so weak as to be difficult to detect.

A supplementary method to that given above for determining the suitability of metal salts for use in this invention, therefore, comprises dissolving at least 10%, and preferably at least 30%, of the salt in acrylonitrile monomer, with or without added water, and comparing the infrared absorption spectrum of the resulting solution with that of the pure monomer. If desired, solutions of acrylonitrile polymer in concentrated aqueous salt solutions, compared with the pure polymer, may be used instead in this test. In either case, substantial solubility should be obtained at room temperature and the characteristic band shift of from about 5–40 cm.$^{-1}$ will be observed.

The following table lists the frequency shifts which have been observed for a number of typical solvent metal salts which are suitable for use in this invention.

| Solvent metal salt: | Frequency shift (cm.$^{-1}$) |
|---|---|
| None | 0 |
| $CaBr_2$ | 26 |
| $CaI_2$ | 26 |
| LiBr | 26 |
| LiI | 26 |
| $CdI_2$ | 31 |
| $ZnCl_2$ | 35 |
| $ZnI_2$ | 36 |
| $ZnBr_2$ | 36 |

Other salts which may be used in addition to those indicated above are the bromides and iodides of strontium, sodium and potassium and the chlorides of calcium, strontium and cadmium and cadmium bromide, calcium thiocyanate and alkali metal thiocyanates.

In mixing monomer/water/metal salt together, the order of adding the components together appears to make no difference in the ultimate results. That is, water may be added to previously mixed metal salt and monomer or monomer may be added to previously mixed metal salt and water.

It has been found that polyhydric alcohols such as glycerol and ethylene glycol may be substituted for a portion of the water in the mixture prior to polymerization. This has the effect of increasing the toughness of the polymerized films at room temperature, and also acts to increase the elongation and therefore the orientability of the films at elevated temperatures as compared with the purely water-containing films, which tend to lose water and thereby become less orientable at high temperatures. Since the alcohols tend to reduce the mutual solubilities of the salt and monomer as compared with equimolar quantities of water, their use is restricted to no more than 50% of the water normally used.

POLYMERIZATION

The type of apparatus and vessel employed for carrying out polymerization will depend upon the type of shaped structure which is to be ultimately formed from the polymer, and it will also depend upon the mode of polymerization, i.e., whether the shaped article is to be formed in accordance with a batch process or a continuous process. If the polymerization is to be carried out batch-wise, the liquid mixture of monomer/water/metal salt is introduced into a vessel which will form the polymerizing mass into its ultimate shape. For example, to form a film or sheet, a cell composed of two sheets of may be employed as the confining vessel to form coal glass or suitable plastic material separated by a flexible gasket (as described in Rohm et al. U.S. Patent 2,067,580) may be employed as the confining vessel to form coalesced films or sheets. On the other hand, if a film or filament is to be formed continuously, the initial mixture of monomer/water/metal salt may be subjected to polymerization conditions in a vessel for a time sufficient to form a relatively fluid prepolymer (which is more viscous than the initial mixture), and this prepolymer may be continuously extruded into very thin tubes or rods to form filaments, or it may be extruded onto a continuously moving belt or drum in order to shape the fluid mass into the form of a film and then complete the polymerization.

Polymerization of the monomer/water/metal salt mixture may be carried out by conventional techniques known to the art. Energy required to effect polymerization may be supplied by heat, ultraviolet light, and/or ionizing radiation. When polymerization is effected by heat, well-known thermal polymerization catalysts may be used, such as the peroxides, e.g., benzoyl peroxide, and similar types of aromatic and aliphatic peroxides, or the well-known azo catalysts described in U.S. Patent 2,471,959 to Madison Hunt may be employed. When ultraviolet light is used, well-known photopolymerization catalysts may be employed such as benzoin and similar types of acyloin catalysts, and the acyloin ethers (benzoin methyl ether) described in U.S. Patents 2,367,660, 2,367,661 and 2,367,670. Polymerization may be effected in the substantial absence of any added catalyst by employing low or high energy ionizing radiation, such as particle irradiation (e.g., electrons) or electromagnetic irradiation (e.g., X-rays and gamma-rays). Other types of ionizing radiation include particle irradiation such as protons, deuterons and alpha-particles. The particles may be accelerated to a high speed by means of a suitable voltage gradient using devices such as a resonant cavity accelerator, a Van de Graaff generator, a betatron, a synchrotron, a cyclotron or the like. The radiation may equally be supplied by the use of radioactive isotopes.

It is found that the presence of atmospheric oxygen generally tends to provide a temporary inhibitory action towards polymerization at room temperature. This can easily be overcome in practice by the use of a slight excess of polymerization catalysts or ionizing radiation. There is, therefore, no necessity for excluding oxygen from the mixture prior to polymerization, although this can be done if desired.

SHAPING A STRUCTURE

Where this step fits into the sequence of steps of this invention depends upon the particular process to be employed for forming a shaped structure, such as a film or filament. For example, in forming a salt-containing homogeneous film, the initial mixture of monomer/water/salt may be introduced into a glass cell composed of two glass plates separated preferably by a flexible or resilient gasket, and the mixture may then be polymerized to completion in such a cell. The resulting product is in the form of a preformed salt-containing film or sheet which is then ready for orientation.

On the other hand, such a process is limited to batch operation. A feasible continuous process would involve prepolymerizing the initial mixture of monomer/water/salt in a relatively large vessel to form a syrup or relatively viscous prepolymer which may then be readily extruded into a multiplicity of thin tubes or rods to form filaments; or it may be extruded onto a moving belt or drum to form a film.

The present invention is particularly adaptable to the formation of films and filaments, more particularly to the formation of highly oriented films containing polymer of high molecular weight. Therefore, it is necessary that sometime before completion of polymerization of the initial monomer/water/salt system, that the polymerizing mass be introduced into an apparatus which shapes the polymerizing mass into the essential shape of the desired final structure prior to completion of the polymerization to form the orientable, self-supporting, high viscous, salt-containing structure. As mentioned hereinbefore, the scope of this invention embraces the formation of various types of shaped structures besides films and filaments, such as rods and tubes which may be subjected to orientation.

COMPLETING POLYMERIZATION

This step is necessary in the event that a continuous process is employed for forming shaped structures wherein the initial mixture of monomer/water/salt is prepolymerized in a separate vessel to form a relatively fluid viscous polymerizing mass and the polymerizing mass formed into a shaped structure, such as a film or filament. In such cases, polymerization of the polymerizing mass must be substantially complete in order to form a tough, rubbery, orientable shaped structure, since the monomer tends to exert a very noticeable plasticizing action of the shaped structure. If polymerization were not substantially complete, it would be found that the characteristics of the resulting shaped structures would be difficult to control, due to the volatility of the unpolymerized monomer.

Completion of polymerization of the shaped structure may be carried out employing the same or a different source of polymerization energy than that used in carrying out prepolymerization of the initial monomer/water/salt mixture.

ORIENTATION

The term, orientation, is used herein to apply to the step of elongating the homogeneous, salt-containing shaped structure in one or two mutually perpendicular directions. Elongation, as mentioned hereinbefore, may be carried out by stretching and/or rolling the structure in one or two mutually perpendicular directions. In the case of orienting homogeneous salt-containing filaments, stretching may be carried out by passing the filaments around rolls or pulleys rotating at differential speeds. Film stretching may be carried out by a number of well-known techniques, such as passing the film longitudinally between two pairs of nip rolls rotating at different speeds or by wrapping the film around rolls and stretching between a bank of slow rolls and fast rolls. Transverse stretching of film may be effected by using well-known tentering apparatus whereby tenter clips grasp the edges of the film and diverge gradually as the film moves in a longitudinal direction. Any well-known stretching apparatus of the type descriped in the prior art may be employed for stretching a homogeneous salt-containing film simultaneously in two directions. It is also within the scope of the present invention to extrude the prepolymer system into tubular form and thereafter orient the tubing by blowing, where a unidirectional stretch is desired, or by blowing and longitudinal stretching of the tubing where biaxial stretching is desired.

In order to maintain the composition of the homogeneous salt-containing structure relatively constant, that is, the same as the composition of the structure immediately after completion of polymerization, the salt-containing structure is oriented in an inert gaseous atmosphere or in air. Orientation is preferably carried out essentially immediately after completion of polymerization, but the salt-containing structure may be stored under conditions such that the composition of the structure remains substantially constant prior to orientation. It is desirable that the atmosphere in which the salt-containing structure is stretched have a relative humidity of at least 30%. On the other hand, the condition of the inert gaseous atmosphere must be such that the composition of the salt-containing film during orientation is not substantially changed, as by the addition of excess water.

In order to obtain the benefits of the present process, the coalesced film or other structures must be stretchable in a single direction to an extent of at least 4× and preferably 5× at room temperature in air at 50% relative humidity. In the case of forming biaxially oriented film, the homogeneous salt-containing film structure must be stretchable in each of the two mutually perpendicular directions to an extent of at least 1.5× and preferably at least 2× in order to be capable of being converted to final tough films having a relatively high level of impact strength and durability. To form films having maximum toughness, the homogeneous salt-containing films should be stretched to substantially the highest extent possible in two mutually perpendicular directions which may be up to 3.5× in each direction. However, to form films having a relatively high degree of post-formability combined with suitable toughness for laminations to metal substrates, the homogeneous salt-containing films are preferably stretched 1.5× to 2.0× in the two mutually perpendicular directions.

WASHING

After orientation, the oriented homogeneous salt-containing structure must be washed to remove substantially all of the metal salt contained therein. In order to obtain optimum optical properties, i.e., clarity, in the case of oriented films, the washing bath should be maintained at a relatively low temperature, for example, within the range from 0° C.–20° C. Although the washing bath may contain any liquid which is inert toward the oriented shaped structure and which will dissolve the metal salt from the film, such as alcohols, glycols and the like, the preferred washing bath is, of course, water. In the case of washing oriented filaments, the initial temperature of the washing bath is not essentially critical, and the bath may be maintained at temperatures as high as 75° C. In the case of films, the oriented film after initial contact with a water bath at a relatively low temperature may then be further washed in a water bath at more elevated temperatures to complete the washing cycle.

It is an essential and critical part of the washing step that the oriented, initially salt-containing structure, particularly in the case of films and filaments, be maintained under tension such that substantially no dimensional change is permitted. Various well-known washing techniques may be employed for removing essentially all of the solvent metal salt from the oriented shaped structures. Additives such as disclosed in U.S. Patents 2,648,592 and 2,648,593, which tend to act as metal salt scavengers may be added to the water bath in order to aid in completely removing the metal salt from the oriented gel structure.

If desired, instead of washing out the solvent metal salt, it is possible to convert the salt to an insoluble metal salt or to the pure metal by well-known methods. Thus, zinc chloride can be converted to insoluble zinc sulfide to provide a luminescent film or to insoluble silver chloride to provide a photographic film, etc. Sodium thiocyanate can be converted to insoluble ferric thiocyanate and then reduced to insoluble iron to provide a film suitable for use as magnetic tape. Or the sodium thiocyanate can be converted to insoluble silver thiocyanate and then reduced to metallic silver to provide a mirror-finish film, etc.

DRYING

In order to complete the process of the present invention, it is necessary to remove water from the washed oriented structure, the remaining water being essentially that which is in equilibrium with the surrounding atmosphere. Here again, it is a critical aspect of this invention that the drying step be carried out while the film or filament or other shaped structure is maintained under tension such that essentially no change in dimensions is permitted during the drying step.

While relatively highly oriented, durable films and other structures are obtained by drying at room temperature or thereabouts while maintaining tension, structures of increased orientation and decreased void content are obtained by heat treatment at temperatures from 90° C. to the temperature beyond which thermal degradation of the polymer occurs, preferably from 150°–250° C., for a time sufficient to raise the film density to at least 1.170 grams per cubic centimeter as described in copending application U.S. Serial No. 740,140, filed June 5, 1958 to K. R. Osborn and assigned to the assignee of the present application.

The following examples are specific embodiments of the present invention. It should be understood that the examples although illustrating the invention, are not limitative thereof.

Example 1

The following components were mixed together at room temperature to form a clear, homogeneous relative non-viscous solution:

|  | Parts by weight | Mole [1] percent |
|---|---|---|
| Acrylonitrile monomer | 37 | 32.5 |
| Zinc chloride | 44 | 15.2 |
| Distilled water | 20 | 52.3 |
| Hydrochloric acid | 1 | |
| Benzoin | 0.5 | |

[1] Based on sum of monomer, salt and water.

The solution was poured between two thin glass plates spaced 20 mils apart (using a film of polyethylene terephthalate 20 mils in thickness as a spacer), employing clamps to hold the glass plates in position. The resulting closed cell was exposed to ultraviolet light from a bank of five Westinghouse fluorescent sunlamps (15 watts each) for approximately 20 minutes. The plates were separated and the resulting clear, homogeneous, coalesced, salt-containing film was stripped from the plates. This film was clear, relatively tough, and flexible, qualitatively resembling a sheet of clear vulcanized rubber. The room temperature Instron tensile properties of this film were as follows:

Initial tensile modulus __________________ p.s.i.__ 180
Elongation _____________________________ percent__ 570
Tensile strength ________________________ p.s.i.__ 710

The polymerized, salt-containing film was then stretched at room temperature (23° C.) and under conditions of 50% relative humidity to an extent of about three times (3×) (200% elongation) its original dimensions in two mutually perpendicular directions, using simultaneous stretching in a machine stretcher. The film prior to stretching was 5.25 x 5.25 inches. In the machine stretcher, stainless steel clips approximately 2 inches long with 0.5 inch serrated jaws were used to clamp the film in the machine. Three such clips were attached to each side of the film, and blotting paper was used to insulate the film from the metal jaws of the clips. Each set of three clips on each side of the film was connected to a motor-driven stretcher bar. The stretcher bars on opposite sides of the film were then pulled apart to achieve simultaneous biaxial stretching. The connecting arms of the stretcher were shaped like inverted U's so that the film while held by the clips could be placed in a galvanized metal pan approximately two inches in depth.

After the film was stretched to the desired extent in both directions, the stretcher was stopped and maintained in a position to hold the film under tension, and then cold water (15° C.) was poured into the pan until the film became totally immersed. In this manner the salt was extracted from the film while it was in its extended state. After about five minutes of extraction, the resulting stretched, partially extracted film was clamped in square frames to keep the film under tension, and thereby restrict dimensional change in the directions of stretch. The frames consisted of stainless steel squares made from strips of metal approximately one inch wide, and the films were held in place in the frames by means of clamps. The stretched film, clamped in this manner, was then extracted in cold water for 16 hours, and thereafter washed in relatively hot water (65° C.) for one hour. After extraction, excess water was removed from the surface of the films by blotting, and then the restrained film was dried in moving air for one hour at 130° C.

As controls, samples of the polymerized, salt-containing film were not stretched, but were directly washed free of salt and dried in a manner similar to that described above. In Control A, the unstretched salt-containing film was washed and dried under tension. In Control B, the unstretched salt-containing film was washed and dried under no tension. In Control C, the washed film of Control A was stretched simultaneously in two directions.

The film was kept immersed in hot water during stretching to facilitate stretching. After being stretched, the film was dried.

As a fourth control, Control D, a film was prepared starting with the acrylonitrile polymer instead of the monomer using the following procedure. The following ingredients were stirred together, then ball milled 24 hours using stainless steel balls in reinforced porcelain mill jar:

|  | Grams | Mole ratio [1] |
|---|---|---|
| Acrylonitrile polymer | 74 | 2.2 |
| Zinc chloride | 88 | 1.0 |
| Distilled water | 200 |  |
| Hydrochloric acid | 1 |  |

[1] Same ratio as in Example 1.

The resulting dispersion was sandmilled twice and then degassed by stirring while in a vacuum. Films were cast using a 50 mil doctor knife. The first set were air dried at about 23° C. overnight. The resulting films were quite weak and were not capable of being stretched to a substantial extent. Tests with an air oven indicated that better coalescence was obtained at elevated temperatures, preferably at about 50° C. A second set of films was then prepared by oven drying at 50° C. for about 4 hours, followed by equilibration with room air (24° C., ca. 50% R.H.) for 24 hours prior to machine stretching. An infrared test of the rubbery gel films indicated 47 mole percent water. The gel film composition at the time of stretching was therefore:

Mole percent
Acrylonitrile polymer ___________________________ 36
Zinc chloride ___________________________________ 17
Water __________________________________________ 47

The gel films were then machine stretched as in Example 1. It was found essentially impossible to stretch these films to above about 2.5× in both directions. Films were stretched 2.5 x 2.5 (clip to clip distance) as in example 1 and extracted and dried just as in the example. The final film was somewhat hazy and its top surface was grainy compared to the shiny, clear film of the invention.

The physical properties of the control films are compared with those of the biaxially oriented final film of this example in the following table, Table I. The inherent viscosity of the polymer in all films was measured and found to fall between 7 and 9.

TABLE I

| Physical Property | Example 1 | Control A | Control B | Control C | Control D |
|---|---|---|---|---|---|
| Tensile strength (p.s.i.) | 34,500 | 14,000 | 10,500 | 14,000 | 18,000 |
| Elongation (percent) | 56 | 3 | 2 | 2 | 20 |
| Initial tensile modulus (p.s.i.) | 955,000 | 750,000 | 700,000 | 750,000 | 635,000 |
| Pneumatic impact strength (kg.-cm mil) | 7.1 | <1 | <1 | <1 | 2.5 |
| I.P.V. | 60 | 130 | 135 | 130 | 95 |
| Orientation angle (degrees) | 45 | 100 | 120 | 100 | 65 |

In the above table and in the examples to follow, the properties of the acrylonitrile polymer films prepared by this invention were measured in accordance with the following tests:

PNEUMATIC IMPACT STRENGTH

Pneumatic impact strength is the energy required to rupture a film. It is reported in kilogram-centimeters/mil of thickness of the film sample. Pneumatic impact strength is determined by measuring the velocity of a ball mechanically accelerated by air pressure, first in free flight and then in flight immediately after being impeded by rupturing the test film sample. In this test, the film sample is 1¾" x 1¾". The projectiles are steel balls ½" in diameter and weighing 8.3 grams. The free flight ball velocity is 40±2 meters/second. The velocities are measured by timing photoelectrically the passage of the steel balls between two light beams set a definite distance apart. The pneumatic impact strength is measured by the loss in kinetic energy of the ball due to the rupturing of the film sample. It is calculated from the following formula:

Constant × (square of velocity in free flight minus square of velocity in impeded flight)

where the constant is directly proportional to the weight of the projectile and inversely proportional to the acceleration due to gravity. This test is carried out at 23° C. and 50% relative humidity, and the test samples are conditioned for 24 hours at 23° C. and 50% relative humidity.

TENSILE STRENGTH, ELONGATION AND INITIAL TENSILE MODULUS

These measurements are made at 23° C. and 50% relative humidity. They are determined by elongating the film sample (samples were cut with a Thwing-Albert Cutter which cuts samples 0.25" wide) in an Instron tensile tester at a rate of 100% per minute until the sample breaks. The initial head-to-head gap is 2", and the salt-containing coalesced film test samples are clamped between blotting paper in order to prevent tearing at the clamps. The force applied at the break in pounds/square inch (p.s.i.) is the tensile strength. The elongation is the percent increase in the length of the sample at breakage. Initial tensile modulus in p.s.i. is directly related to film stiffness. It is obtained from the slope of the stress-strain curve at an elongation of 1%; both tensile strength and initial tensile modulus are based upon the initial cross-sectional area of the sample. Measurements made on essentially dry salt-free films are made after aging the film sample at the test temperature and humidity for at least 24 hours. Measurements made on salt-containing coalesced films are made without such conditioning, however. Instead they are made substantially immediately after exposing the film to the atmosphere, the film being protected from possible change of water content prior to testing by storage within closed containers.

MOISTURE PERMEABILITY OR INITIAL PERMEABILITY VALUE (IPV)

The measurement of moisture permeability is made by placing a single sheet of the film over the top of an aluminum cup containing 15 milliliters of water, the test area being 33.3 square centimeters. The assembly is weighed accurately and then placed in a dry (less than 3% R.H.) air-swept oven at 39.5° C. for 48 hours. The assembly is removed from the oven, removed to room temperature and reweighed. The weight loss is converted to grams of water lost per 100 square meters per hour. The values given in the examples are the grams of water lost per 100 square meters per hour for the second 24-hour period.

DENSITY

The density of the film specimen is measured by placing the specimen in a liquid column exhibiting a substantially linear density gradient. The level at which the specimen comes to rest is compared to the levels of standards of known density. The density of the film specimen is obtained by interpolation between the levels of the density standards. With the films of this invention, a suitable density gradient is prepared by mixing heptane and carbon tetrachloride.

MEASUREMENT OF WIDE ANGLE X-RAY DIFFRACTION PATTERNS

The wide angle diffraction pattern is obtained as follows. The diffraction sample is mounted as described below in a flat plate camera having sample to photographic film distance of 2.5 centimeters. A beam of nickel-filtered copper K-alpha radiation is directed through the center of the diffraction specimen and perpendicular to the plane of the recording photographic film. Using the model XRD-5 X-ray diffraction apparatus, manufactured by the General Electric Co., the X-ray tube is operated at 16 milliamps and 50 kilovolts, and the X-ray beam is collimated by passage through two successive pin holes of diameter 0.025 inch, which are spaced three inches apart in the collimator. Excessive blackening of the photographic film due to the undiffracted portion of the incident beam is prevented by the use of a flattened circular lead beam stop 0.6 mm. in diameter which is mounted adjacent to said film, being positioned at the center of the diffraction pattern so as to intercept the undiffracted beam. When the diffraction pattern is obtained with the incident beam perpendicular to the plane of the film diffraction specimen (herein described as "perpendicular" or "transmission" exposures), the film diffraction specimen is prepared by stacking successive layers of the film, all having the same orientation relative to one another with respect to the stretch axes of the film, to a thickness of 0.050 inch. This film diffraction specimen is then mounted in the camera in a manner such that the plane of the film layers is perpendicular to the diffraction beam. When the diffraction pattern is obtained with the beam parallel to the plane of the film diffraction specimen (herein described as "edge-wise" or "edge" exposures), a strip of film is first cut parallel to one of the axes of stretch, then this is folded upon itself in a zig-zag fashion in such a manner that a relatively thick edge (greater than the diameter of the incident X-ray beam) is provided. The width of said strip of film in the direction of the incident beam is 0.020 inch. Where said patterns are to be used in determination of orientation angle, the time of exposure is adjusted so that the maximum optical density of the photographic image on the negative resulting after development according to conventional procedures is between 0.7 and 0.9.

ORIENTATION ANGLE

The measurement of orientation angle indicates the degree of alignment of polymer chains parallel to the plane of the film specimen. For a biaxially stretched film which has been stretched to essentially the same extent in two mutually perpendicular directions, no orientation effects are detectable in an X-ray diffraction pattern taken with the X-ray beam directed perpendicular to the plane of the film. This indicates that the polymer chains are randomly oriented with respect to rotation within the plane of the film, and therefore with respect to the X-ray beam. On the other hand, if the diffraction pattern is obtained with the beam parallel to the plane of the film, wherein the X-ray beam is directed onto an edge of the film, distinct orientation effects can be seen since the polymer chains are preferentially oriented parallel to the plane of the film, and therefore the formerly continuous circular diffraction rings are now broken into discontinuous arcs, which tend to subtend smaller angles as the orientation is increased. Such an X-ray diffraction pattern is obtained by cutting a strip of film parallel to one of the axes of stretch, and folding the strip of film upon itself in a zig-zag fashion (as described under "Measurement of Wide Angle X-Ray Diffraction Pattern") so that a relatively thick edge is provided. This sample is then mounted in an X-ray apparatus so that the beam passes parallel to the plane of the film and one edge of the film, but perpendicular to the other film edge.

A quantitative measure of the degree of orientation is obtained by determining essentially the length of one of the arcs on the X-ray diffraction pattern. This is done by making a circular densitometer trace around the ring diffraction pattern using the principal reflection, which occurs at a Bragg angle $2\theta$ of approximately 17°. Such a trace gives a typical pattern as shown in FIGURE 2B of copending U.S. application Serial No. 740,140 assigned to the assignee of the present application, wherein the symbol $I_t$ represents the total intensity; $I_B$ represents background intensity; and $I_t$ minus $I_B$ is the intensity of scattering due to diffraction represented by the symbol $I_D$, i.e., $I_D = I_t - I_B$. Orientation angle is defined as the width of the peak in FIGURE 2B at half the maximum intensity. This half width is measured in terms of the number of degrees in the central angle which subtends the arc at the points indicated in FIGURE 2A of the aforementioned patent application. Thus, a high degree of orientation is indicated by relatively low orientation angles, and an orientation angle of 180° (or for practical purposes, greater than 100°) indicates no orientation in the film sample.

MEASUREMENT OF SPECTROGONIOMETER X-RAY DIFFRACTION PATTERN

The wide angle spectrogoniometer X-ray diffraction pattern is obtained by using a local intensity direct recording measuring receiver such as a Geiger-Muller counter rather than a photographic film to record the diffracted rays. The method involves irradiation of a specimen with essentially monochromatic X-rays while measuring the intensity of the diffracted radiation at various Bragg scattering angles by moving the intensity measuring receiver through the cone of diffracted radiation while recording the intensity of the radiation as a function of the Bragg angle. A highly quantitative record can be obtained by this method. The general technique is described, for example, in Klug and Alexander, "X-Ray Diffraction Procedures," Wiley, New York, 1954, p. 235 ff.

In this work the General Electric Model SPG Spectrogoniometer was used in conjunction with the model XRD-5 X-ray diffractor apparatus, also manufactured by the General Electric Company. With this equipment a flat sample such as a polymeric film is mounted against a suitable sample holder. The incident radiation is directed against the surface of this film sample in a direction which is substantially tangential to the surface of the film sample at low Bragg angles. The diffracted radiation is detected by a Geiger-Muller counter, which rotates through successively larger scattering angles during the course of the measurement. In order to satisfy the conditions for the parafocusing principle which is used, it is necessary that the sample mount also rotate but at an angular rate one-half that of the detector. The intensity of the diffracted beam is amplified and plotted on a strip chart recorder as a function of twice the Bragg angle, two theta. The appearance of the resulting trace is that of a series of peaks corresponding to the various circular rings or halos seen on a flat plate X-ray diagram.

Nickel-filtered copper K-alpha radiation was used, together with an argon-filled Geiger-Muller counter. The X-ray tube was operated at 16 milliamps and 50 kilovolts, and the X-ray beam was collimated by passage through a 1° slit before striking the sample. The samples used were from 10 to 20 mils thick for the salt-containing homogeneous films, and from 1 to 3 mils thick for the salt-free films. The pattern was scanned, in a direction of increasing Bragg angle, at a rate of 2° per minute (in units of two theta), using a medium range Soller slit, with a detector slit of 0.2°, and a recorder time constant of four seconds.

INHERENT VISCOSITY

The inherent viscosity, a relative measure of molecular weight, is defined as follows. A solution containing 0.05 gram of polyacrylonitrile per 100 milliliters of dimethyl sulfoxide is prepared by dissolving the polymer in vacuum distilled dimethyl sulfoxide containing less than 0.05% water (by weight) using high speed stirring for 60 minutes with the solution maintained at 100° C. The resulting solution is cooled to room temperature, then 6 milliliters of said solution are transferred to an Ostwald-Fenske viscometer, Series 75. The viscometer is next placed in a thermostat maintained at 30° C., and the polymer solution is allowed to flow through the capillary of the viscometer. The efflux time is taken as the time required for the meniscus of the solution to pass between the two calibration points of the capillary. This process is repeated until successive efflux times agree to within 0.2%. The average of said efflux times is taken as $t_s$, the solution time. An equal volume of pure solvent which has been subjected to an identical stirring and heating cycle is run through the viscometer using the same procedure, in order to obtain $t_o$, the solvent time. The quotient of solution time divided by solvent time ($t_s/t_o$) is defined as the relative viscosity. The inherent viscosity is defined as being equal to the natural logarithm of the relative viscosity divided by the solution concentration expressed as grams/100 milliliters.

*Example 2*

In this example the limits for the operable compositions shown in FIGURE 1 were determined. A composition of acrylonitrile, zinc chloride and water, the mole percentages of which are shown in Table II, was mixed together at room temperature. To the mixture was added 0.5% by weight benzoin methyl ether, based on monomer content, as photoinitiator. Also, 2% by weight concentrated hydrochloric acid, based on the weight of zinc chloride, was added to the composition. The resulting mixture was then stirred at room temperature either until a homogeneous solution was obtained or until it was determined that more than one permanent phase had formed. Where more than one phase was thought to have formed, the stirring was carried out for a period of at least one hour prior to discarding the solution. In those cases in which a single liquid phase had formed, the resulting solution was then subjected to photopolymerization in glass cells as described above to form homogeneous, coalesced salt- and water-containing polymeric films. It was found that the polymerization was 95% complete within the first 20 minutes. In order to insure complete polymerization, however, the irradiation was carried out for a period of at least 60 minutes.

The resulting homogeneous, polymerized, salt-containing films having inherent viscosities ranging from 5 to 12 were then tested for elongation at room temperature (23° C.). The results are summarized in Table II.

TABLE II

| Test | Starting composition (mole percent monomer/salt/water) | Elongation (percent) |
| --- | --- | --- |
| A | 64/16/20 | 326. |
| B | 60/20/20 | 308. |
| C | 48/12/40 | 410. |
| D | 45/15/40 | 471. |
| E | 46/23/30 | 350. |
| F | 43/22/35 | 450. |
| G | 39/20/41 | 570. |
| H | 42/28/30 | 428. |
| I | 33/17/50 | 600. |
| J | 36/24/40 | 651. |
| K | 25/13/62 | 510. |
| L | 24/16/60 | 632. |
| M | 20/20/60 | 1,221. |
| N | 25/25/50 | 1,510. |
| O [1] | 70/10/20 | 210. |
| P [1] | 48/32/20 | <1. |
| Q [1] | 16/24/60 | 277. |
| R [1] | 12/18/70 | 181. |
| S [1] | 6/19/75 | <100. |
| T [1] | 10/30/60 | <100. |
| U [1] | 0/36.3/63.7 | Liquid and solid phases. |
| V [1] | 2.6/0/97.4 | Two separate liquid phases. |
| W [1] | 11/12/77 | Do. |
| X [1] | 90.6/0/9.4 | Do. |
| Y [1] | 16/9/75 | Do. |
| Z [1] | 13/7/80 | Do. |
| AA [1] | 32/8/60 | Do. |

[1] Outside operable range of compositions.

*Examples 3–7*

Samples from tests A, C, F, H and K, representative of compositions considered operable according to the elongation test, were stretched biaxially 2× in each direction using the method described in Example 1. The resulting stretched films were clamped under tension and extracted for one hour in 95° C. water, and finally dried under tension at 130° C. in a circulating air oven. The properties of the resulting oriented polyacrylonitrile films, which were substantially free of salt and water, are given below in Table III.

As controls, samples from Tests O and P were taken. These polymerized, salt-containing films were excessively stiff and brittle and could not be stretched to an extent of at least 1.5× in each direction. Final films prepared from these compositions, although stretched to the highest extent possible, i.e., less than 1.5× in each direction, were excessively brittle due to a lack of sufficient orientation. These films were characterized by a relatively high value of the initial tensile modulus.

As additional controls, samples from tests Q, R, S and T were examined. These polymerized, salt-containing films were excessively soft, lacked strength and could not be oriented to any substantial degree upon room temperature stretching.

The results of the examples are summarized in Table III.

TABLE III

| Ex. | Starting composition (monomer/salt/water) | Tensile strength (p.s.i.) | Elongation (percent) | Initial tensile modulus (p.s.i. × $10^{-3}$) | Pneumatic impact strength (kg. cm./mil) | Orientation angle (degrees) |
| --- | --- | --- | --- | --- | --- | --- |
| 3 | 64/16/20 | 20,500 | 87 | 656 | 0.7 | 55 |
| 4 | 48/12/40 | 20,500 | 101 | 693 | 0.8 | 62 |
| 5 | 43/22/35 | 23,500 | 92 | 722 | 1.0 | 69 |
| 6 | 42/28/30 | 16,500 | 79 | 637 | 0.5 | 55 |
| 7 | 25/13/62 | 17,100 | 116 | 490 | 3.5 | 58 |

*Examples 8–11*

Samples from tests C, F, H and K, representative of compositions considered operable according to the elongation test, were stretched biaxially 2.5× in each direction using the method described in Example 1. The resulting stretched films were clamped under tension and extracted for one hour in 95° C. water, and finally dried under tension at 130° C. in a circulating air oven. The properties of the resulting oriented polyacrylonirile films, which were substantially free of salt and water, are given below in Table IV.

TABLE IV

| Ex. | Starting composition (monomer/salt/water) | Tensile strength (p.s.i.) | Elongation (percent) | Initial tensile modulus (p.s.i. × $10^{-3}$) | Pneumatic impact strength (kg.-cm./mil) | Orientation angle (degrees) |
| --- | --- | --- | --- | --- | --- | --- |
| 8 | 48/12/40 | 26,600 | 72 | 680 | 4.0 | 48 |
| 9 | 43/22/35 | 31,200 | 61 | 740 | 5.0 | 53 |
| 10 | 42/28/30 | 22,000 | 65 | 676 | 0.6 | 50 |
| 11 | 25/13/62 | 26,100 | 68 | 651 | 5.6 | 55 |

*Examples 12–16*

Samples from tests C, F, G, I and K, representative of compositions considered operable according to the elongation test, were stretched biaxially 3.0× in each direction using the method described in Example 1. The resulting stretched films were clamped under tension and extracted for one hour in 95° C. water, and finally dried under tension at 130° C. in a circulating air oven. The properties of the resulting oriented polyacrylonitrile films, which were substantially free of salt and water, are given below in Table V.

TABLE V

| Ex. | Starting composition (monomer/ salt/ water) | Tensile strength (p.s.i.) | Elongation (percent) | Initial tensile modulus (p.s.i. x 10⁻³) | Pneumatic impact strength (kg.-cm./ mil) | Orientation angle (degrees) |
| --- | --- | --- | --- | --- | --- | --- |
| 12 | 48/12/40 | 35,600 | 55 | 721 | 5.0 | 42 |
| 13 | 43/22/35 | 33,100 | 44 | 928 | 5.4 | 42 |
| 14 | 39/20/41 | 30,900 | 55 | 842 | 5.3 | 45 |
| 15 | 33/17/50 | 32,700 | 67 | 854 | 5.0 | 45 |
| 16 | 25/13/02 | 21,500 | 55 | 487 | 5.5 | 45 |

*Examples 17–22*

These examples illustrate the preparation of highly oriented films from copolymers of acrylonitrile with other copolymerizable monomers. Homogeneous acrylonitrile polymer films containing aqueous zinc chloride were formed by subjecting to photopolymerization a liquid composition comprising acrylonitrile monomer to which had been added a specified quantity of a second monomer, zinc chloride and water. The mole percentages of total monomer/zinc chloride/water were 40/20/40. The composition prior to polymerization also contained 1% by weight benzoin methyl ether as photoinitiator based on total monomer and 2% hydrochloric acid by weight based on zinc chloride. The resulting coalesced, salt-containing films were stretched to an extent of 3.0× in each direction using simultaneous stretching, then were washed under tension in hot water for 1 hour and thereafter heat treated at 120° C. in air.

The following table, Table VI, indicates the weight of the second monomer, based on the weight of acrylonitrile monomer, in the starting composition, and the properties of the final films. It will be noted from the data in the table that in each case a tough, highly oriented acrylonitrile polymer film was obtained.

TABLE VI

| Ex. | Second monomer (weight percent based on total monomer) | Inherent viscosity | Initial tensile modulus (p.s.i. x 10⁻³) | Elongation (percent) | Tensile strength (p.s.i. x 10⁻³) | Pneumatic impact strength (kg.-cm/ mil) |
| --- | --- | --- | --- | --- | --- | --- |
| 17 | None | 5–12 | 650–750 | 40–80 | 30–32 | 5–9 |
| 18 | 11% methyl acrylate | 11.2 | 787 | 55 | 28.5 | 6 |
| 19 | 25% methacrylonitrile | 4 | 597 | 74 | 17.0 | 5 |
| 20 | 1% vinyl steraate | 11.5 | 700 | 64 | 30.0 | 5 |
| 21 | 10% N,N-diethyl-acrylamide | 13 | 641 | 53 | 21.1 | 3 |
| 22 | 10% butylcarbitol methacrylate | | 638 | 68 | 18.8 | 4 |

*Example 23*

In this example is described the preparation of a homogeneous, salt-containing polymerized film suitable for biaxially stretching to a high degree wherein the solvent metal salt is lithium bromide. Using a procedure essentially identical to that described in Example 2, a mixture was prepared from acrylonitrile monomer, lithium bromide and water in mole percentages 35/24/41. To this was added 1% benzoin methyl ether based on the weight of monomer. A polymerized salt-containing film was prepared from this solution by photopolymerization essentially as described in Example 2, except that the time of ultraviolet irradiation was 2 hours. The resulting clear, tough, rubbery salt-containing film had an initial tensile modulus of 3,700 p.s.i., ultimate elongation 425% and tensile strength 1,040 p.s.i. The polymer had an inherent viscosity of 4.5.

*Example 24*

This example describes the preparation of a homogeneous, salt-containing film suitable for biaxial stretching to a high degree wherein the solvent metal salt is zinc bromide. Using methods identical to those described in Example 23, a liquid solution corresponding to mole percentages acrylonitrile monomer/zinc bromide/water of 40/20/40 were prepared. The resulting solution was converted to a homogeneous, salt-containing polymerized film by ultraviolet light irradiation for 2 hours. The polymer produced was of high molecular weight, being substantially insoluble in dimethyl sulfoxide at 100° C. The salt-containing film was tough, rubbery and stretchable to a high degree. It had an initial tensile modulus of 1,590 p.s.i., an ultimate elongation of 467% and a tensile strength of 228 p.s.i.

*Example 25*

In this example is illustrated the use of high energy radiation to polymerize a solution of acrylonitrile monomer in aqueous zinc chloride, and the preparation of a biaxially stretched, highly oriented polyacrylonitrile film therefrom.

A clear solution was prepared by mixing together 63 grams (41.0 mole percent) acrylonitrile monomer, 81 grams (20.6 mole percent) zinc chloride, 20 ml. (38.4 mole percent) distilled water and 2 ml. concentrated hydrochloric acid. A portion of this solution was placed in a glass cell identical to that described in Example 2. The cell was then subjected to irradiation by high energy electrons from a Van de Graaff generator. This was done by passing the cell, in a horizontal position and cooled by contact with Dry Ice, under a vertical beam of 2-m.e.v. electrons, using 6 passes through the beam at a speed of 2 centimeters per second, with a beam scan width of 20 centimeters, sample to window distance of 10 centimeters, and beam current of 250 microamperes. Under these conditions, the monomer solution received an irradiation dose of 8 megarad. The cell was opened and it was found that complete conversion of the monomer to polymer of inherent viscosity 3.5 had occurred. The resulting coalesced salt-containing film was essentially identical to that prepared from a similar composition using photoinitiation as in Example 2.

The film was then machine stretched at room temperature to an extent of 3× in each of two mutually perpendicular directions, extracted in cold water for 16 hours while under tension and subsequently heat treated in an air oven at 130° C. for one hour. The resulting biaxially oriented polyacrylonitrile film had an initial tensile modulus of 862,000 p.s.i., elongation 38%, tensile strength 24,300 p.s.i., tear strength 5.5 grams per mil and pneumatic impact strength 1.2 kg.-cm./mil.

*Example 26*

This example illustrates the use of peroxide catalyst to initiate the polymerization of acrylonitrile monomer in aqueous salt solution.

A solution consisting of 37 grams (45.1 mole percent) acrylonitrile, 40 grams (19.0 mole percent) zinc chloride, 10 grams (35.9 mole percent) distilled water, 1 ml. concentrated hydrochloric acid and 0.2 gram benzoyl peroxide was prepared. A portion of this solution was placed in a cell identical to that described in Example 2. The cell was then placed in a circulating air oven at a temperature of 90° C. for 15 minutes. Upon removal of the cell from the oven it was found that the solution had been converted to a polymerized salt-containing film similar to that prepared by photopolymerization of a similar solution containing benzoin methyl ether as initiator, as described in Example 2.

*Example 27*

This example illustrates the use of heat alone to initiate the polymerization of a solution of acrylonitrile monomer in aqueous zinc chloride.

A solution identical with that prepared in Example 25 was prepared. This was placed in a cell identical to the one described in the preceding examples and placed in an oven at 55° C. for one hour. Upon opening the cell at the completion of this time it was found that the solution had been converted to a polymerized salt-containing film essentially identical to that prepared by the method of photoinitiation. This was found to be suitable for biaxial stretching to a high degree and was used to prepare highly oriented polyacrylonitrile films similar to those described in the preceding examples.

A second cell filled with the same solution was merely left exposed to room light without additional heating. It was observed that the solution was gradually polymerized (presumably by the action of the room light) over a period of several days into a salt-containing coalesced film similar to those described in the preceding examples.

*Example 28*

This example illustrates the use of a fluid medium other than water to extract the salt from a stretched polymerized film. A homogeneous salt-containing polymerized film identical to that prepared in test G of Example 2, i.e., 39 acrylonitrile/20 zinc chloride/41 water, was stretched to an extent of 3.2× by simultaneous machine stretching in two mutually perpendicular directions. While under tension the film was extracted in the stretcher for one hour in ethylene glycol at 85° C. The film was then clamped in a square frame while held under tension, washed in cold water (15° C.) for 16 hours and finally dried for one hour at 130° C. in an air oven. The resulting biaxially oriented polyacrylonitrile film had an initial tensile modulus of 667,000 p.s.i., elongation 70%, tensile strength 24,300 p.s.i. and pneumatic impact strength 1.6 kg.-cm./mil.

*Example 29*

This example illustrates the addition of a polyhydric alcohol (glycerol) to the monomer solution prior to polymerization.

A mixture consisting of 63 grams (41.0 mole percent) acrylonitrile monomer, 81 grams (20.6 mole percent) zinc chloride, 25.5 grams (9.6 mole percent) glycerol, 15 grams (28.8 mole percent) distilled water, 2 ml. concentrated hydrochloric acid and 0.8 gram benzoin methyl ether as photoinitiator was prepared. A clear solution resulted. This was placed in a glass cell similar to those described in the preceding examples and subjected to ultraviolet irradiation for a period of 25 minutes. A rubbery coalesced film of exceptional toughness, compared with a corresponding film containing an equimolar amount of only water instead of water and glycerol, resulted. The tensile properties at 23° C. of this salt-containing film were as follows: initial tensile modulus 619 p.s.i., elongation 533%, and tensile strength 1566 p.s.i. At 100° C. this salt-containing film had a modulus of 164 p.s.i., elongation 812% and tensile strength 221 p.s.i.

Samples of the salt-containing film prepared as described above were machine stretched simultaneously to an extent of 3× in each of two mutually perpendicular directions, then extracted for 1 hour in 15° C. water while held under tension, next extracted for 1 hour in 70° C. water and finally heat treated while still under tension for 1 hour at 130° C. in a circulating air oven. The physical properties of this film are given in the following table, Table VII.

TABLE VII

| | |
|---|---|
| Initial tensile modulus (p.s.i.) | 679,000 |
| Elongation (percent) | 60 |
| Tensile strength (p.s.i.) | 32,400 |
| Pneumatic impact strength (kg.-cm./mil.) | 8.9 |
| Orientation angle | 60° |
| Density | 1.1769 |
| Inherent viscosity (0.05% in dimethyl sulfoxide) | 8.6 |

*Examples 30–36*

In these examples is described the preparation of homogeneous, salt-containing polymerized films suitable for biaxially stretching to a high degree wherein the solvent metal salts are those given in Table VIII.

TABLE VIII

| Example: | Solvent metal salt |
|---|---|
| 30 | Calcium bromide. |
| 31 | Sodium bromide. |
| 32 | Calcium iodide. |
| 33 | Cadmium iodide. |
| 34 | Zinc iodide. |
| 35 | Lithium iodide. |
| 36 | Strontium chloride. |

Using a procedure essentially identical to that described in Example 2, a mixture was prepared from acrylonitrile monomer, salt and water in mole percentages 40/20/40. To this was added 1% benzoin methyl ether based on the weight of monomer. A polymerized salt-containing film was prepared from this solution by photopolymerization essentially as described in Example 2, except that the time of ultraviolet irradiation was 2 hours.

The resulting films were clear, tough, rubbery salt-containing films having ultimate elongations of at least 300%.

*Example 37*

The following components were mixed together at room temperature to form a clear, homogeneous relatively non-viscous solution:

| | Parts by weight | Mole [1] percent |
|---|---|---|
| Acrylonitrile monomer | 78.1 | 34.9 |
| Calcium thiocyanate | 57.2 | 8.7 |
| Distilled water | 42.8 | 56.4 |
| Benzoin methyl ether | 1 | |

[1] Based on sum of monomer, salt and water.

The solution was poured between two thin glass plates spaced 20 mils apart (using a film of polyethylene terephthalate 20 mils in thickness as a spacer), employing clamps to hold the glass plates in position. The resulting closed cell was exposed to ultraviolet light from a bank of five Westinghouse fluorescent sunlamps (15 watts each) for approximately 20 minutes. The plates were separated and the resulting clear, homogeneous, coalesced, salt-containing film was stripped from the plates. This film was clear, relatively tough, flexible, and displayed an elongation of over 300%. Qualitatively, the film resembled a sheet of clear vulcanized rubber.

The polymerized, salt-containing film was then stretched at room temperature (23° C.) and under conditions of 50% relative humidity to an extent of about 2.5 times (2.5×) (150% elongation) its original dimensions in two mutually perpendicular directions, using simultaneous stretching in a machine stretcher. In the machine stretcher, stainless steel clips approximately 2 inches long with 0.5 inch serrated jaws were used to clamp the film in the machine. Three such clips were attached to each side of the film, and blotting paper was used to insulate the film from the metal jaws of the clips. Each set of three clips on each side of the film was connected to a motor-driven stretcher bar. The stretcher bars on opposite sides of the film were then pulled apart to achieve simultaneous biaxial stretching. The connecting arms of the stretcher were shaped like inverted U's so that the film while held by the clips could be placed in a galvanized metal pan approximately two inches in depth.

After the film was stretched to the desired extent in both directions, the stretcher was stopped and maintained in a position to hold the film under tension, and then cold water (15° C.) was poured into the pan until the film became totally immersed. In this manner the salt was extracted from the film while it was in its extended state. After about five minutes of extraction, the resulting stretched, partially extracted film was clamped in square frames to keep the film under tension, and thereby restrict dimensional change in the directions of stretch. The frames consisted of stainless steel squares made from strips of metal approximately one inch wide, and the films were held in place in the frames by means of clamps. The stretched film, clamped in this manner, was then extracted in cold water for 16 hours. After extraction, excess water was removed from the surface of the films by blotting, and then the restrained film was dried in an oven for one hour at 130° C.

The physical properties of the biaxially oriented final film of this example are given in the following table, Table IX. The inherent viscosity of the polymer in this film was 6.4.

TABLE IX

| Physical property: | Example 37 |
|---|---|
| Tensile strength (p.s.i.) | 26,200 |
| Elongation (percent) | 57 |
| Initial tensile modulus (p.s.i.) | 639,000 |
| Pneumatic impact strength (kg.-cm./mil) | 6.3 |
| Density | 1.1745 |

Example 38

In this example the limits for the operable compositions shown in FIGURE 2 were determined. A composition of acrylonitrile, calcium thiocyanate and water, the mole percentages of which are shown in Table X, was mixed together at room temperature. To the mixture was added 0.5% by weight benzoi methyl ether, based on monomer content, as photoinitiator. The resulting mixture was then stirred at room temperature either until a homogeneous solution was obtained or until it was determined that more than one permanent phase had formed. Where more than one phase was thought to have formed, the stirring was carried out for a period of at least one hour prior to discarding the solution. In those cases in which a single liquid phase had formed, the pH of the resulting solution was adjusted to 6–8 by the addition of acid and the solution was subjected to photopolymerization in glass cells as described above to form homogeneous, coalesced salt- and water-containing polymeric films. It was found that the clarity of the final film was improved by this pH adjustment. In order to insure complete polymerization, irradiation was carried out for a period of two hours.

The resulting homogeneous, polymerized, salt-containing films having inherent viscosities ranging from 5 to 12 were then tested for elongation at room temperature (23° C.). The results are summarized in Table X.

TABLE X

| Test | Starting composition (mole percent monomer/salt/water) | Elongation (percent) |
|---|---|---|
| A | 58.5/5.5/36 | 320. |
| B | 59/10/31 | 305. |
| C | 59.2/15.1/25.7 | 442. |
| D | 45.5/7.5/47 | 492. |
| E | 41.3/8.2/50.5 | 550. |
| F | 40.2/10.3/49.5 | 541. |
| G | 35/7/58 | 458. |
| H | 32.3/10.4/57.3 | 510. |
| I | 36.4/18.8/44.8 | 1,700. |
| J | 22.5/7.5/70 | 902. |

TABLE X—Continued

| Test | Starting composition (mole percent monomer/salt/water) | Elongation (percent) |
|---|---|---|
| K [1] | 63.5/10.6/25.9 | 71. |
| L [1] | 57.0/18.3/24.7 | <5. |
| M [1] | 50.4/16.2/33.4 | 18. |
| N [1] | 48.5/25.0/26.5 | <5. |
| O [1] | 43.4/22.5/34.1 | 205. |
| P [1] | 21.5/11.1/67.4 | 260. |
| Q [1] | 2.6/0/97.4 | Two separate liquid phases. |
| R [1] | 8.7/5.5/85.8 | Do. |
| S [1] | 21.0/6.8/72.2 | Do. |
| T [1] | 28/7/65 | Do. |
| U [1] | 33.3/6.9/59.8 | Do. |
| V [1] | 40.3/6.7/53 | Do. |
| W [1] | 52/6/42 | Do. |

[1] Outside operable range of compositions.

Example 39

This example illustrates the preparation of tough, oriented polyacrylonitrile film having essentially balanced properties by a process similar to that described in Example 37 except that the polymerized, salt-containing film was stretched sequentially in the two directions prior to extraction and drying under tension.

A sample of polymerized, salt-containing film identical to that whose preparation is described in Example 37 was stretched to an extent of 2.5× in the first direction, then stretched to an extent of 2.5× in the second direction while restraining the film in the first direction. The resulting stretched film was clamped and while held under tension was extracted for 16 hours in 15° C. water and finally dried in an air oven at 130° C. for one hour.

The physical properties of the resulting oriented polyacrylonitrile film are given in Table XI below. In this table the direction of first stretching is indicated by LD, corresponding to longitudinal direction, while properties measured in a direction parallel to the second direction of stretch are indicated by TD, indicating transverse direction. It will be noted that the resulting film had substantially balanced physical properties.

TABLE XI

| Physical property | LD | TD |
|---|---|---|
| Initial tensile modulus (p.s.i.) | 750,000 | 770,000 |
| Elongation (percent) | 40 | 37 |
| Tensile strength (p.s.i.) | 31,500 | 32,500 |
| Pneumatic impact strength (kg.-cm./mil) | 6.1 | |

Example 40

In this example is illustrated the preparation of a tough, highly oriented polyacrylonitrile film from a polymerized, calcium thiocyanate-containing film by a process similar to that used in Example 37, with the exception that the final film was not subjected to an elevated temperature during drying.

A sample of the polymerized, salt-containing film prepared as described in Example 37 was simultaneously stretched in two perpendicular directions to an extent of 3.0× in each direction, as described in Example 37. The stretched film was extracted for one hour in 0° C. water while still in the machine stretcher. The resulting extracted film was clamped and held under tension during the remainder of the treatment. The clamped film was placed in a vacuum oven at 25° C. The oven was evacuated to a pressure of less than 1 mm. mercury for 16 hours, after which the oven was opened and the film removed.

The physical properties of the resulting oriented salt-free polyacrylonitrile film are given in Table XII.

TABLE XII

| Physical property: | |
|---|---|
| Initial tensile modulus (p.s.i.) | 696,000 |
| Elongation (percent) | 52 |

| | |
|---|---|
| Tensile strength (p.s.i.) | 28,800 |
| Pneumatic impact strength (kg.-cm./mil) | 7.2 |
| Density | 1.1575 |

*Example 41*

This example illustrates the preparation of a biaxially stretched polyacrylonitrile film, wherein said film is stretched to a different extent in the two directions, resulting in a film having physical properties greater in one direction, yet not having a pronounced fibrillation tendency along a direction parallel to the direction of greatest orientation.

A sample of the polymerized salt-containing film whose preparation is described in Example 37 was machine stretched sequentially in two mutually perpendicular directions, first to a stretch ratio of 3.0× in one direction and then 2.0× in the other direction. The film was then clamped in a rectangular frame and held under tension during the remainder of the treatment. The film was extracted for 2 hours in 20° C. water, then heat-treated in an oven for 1 hour at a temperature of 130° C. The physical properties of the film are given in the following table, Table XIII. The film had little tendency towards fibrillation upon creasing or reflexing.

TABLE XIII

| Physical property | Direction of 3× stretch | Direction of 2× stretch |
|---|---|---|
| Initial tensile modulus (p.s.i.) | 810,000 | 675,000 |
| Elongation (percent) | 35 | 53 |
| Tensile strength (p.s.i.) | 33,300 | 20,700 |
| Pneumatic impact strength (kg.-cm./mil) | 5.3 | |
| Density | 1.1720 | |

*Example 42*

The following components were mixed together at room temperature to form a clear, homogeneous relatively non-viscous solution:

| | Grams | Mole [1] percent |
|---|---|---|
| Acrylonitrile monomer | 106.1 | 30 |
| Sodium thiocyanate | 81.1 | 15 |
| Distilled water | 66.1 | 55 |
| Benzoin methyl ether | 1.1 | |

[1] Based on sum of monomer, salt and water.

The solution was poured between two thin glass plates spaced 20 mils apart (using a film of polyethylene terephthalate 20 mils in thickness as a spacer), employing clamps to hold the glass plates in position. The resulting closed cell was exposed to ultraviolet light from a bank of five Westinghouse fluorescent sunlamps (15 watts each) for approximately 20 minutes. The plates were separated and the resulting clear, homogeneous, coalesced, salt-containing film was stripped from the plates. This film was clear, relatively tough, and flexible, qualitatively resembling a sheet of clear vulcanized rubber. The room temperature Instron tensile properties of this film were as follows:

| | |
|---|---|
| Initial tensile modulus p.s.i. | 337 |
| Elongation percent | 607 |
| Tensile strength p.s.i. | 765 |

The polymerized, salt-containing film was then stretched at room temperature (23° C.) and under conditions of 50% relative humidity to an extent of about three times (3×) (200% elongation) its original dimensions in two mutually perpendicular directions, using simultaneous stretching in a machine stretcher. The film prior to stretching was 5.25 × 5.25 inches. In the machine stretcher, stainless steel clips approximately 2 inches long with 0.5 inch serrated jaws were used to clamp the film in the machine. Three such clips were attached to each side of the film, and blotting paper was used to insulate the film from the metal jaws of the clips. Each set of three clips on each side of the film was connected to a motor-driven stretcher bar. The stretcher bars on opposite sides of the film were then pulled apart to achieve simultaneous biaxial stretching. The connecting arms of the stretcher were shaped like inverted U's so that the film while held by the clips could be placed in a galvanized metal pan approximately two inches in depth.

After the film was stretched to the desired extent in both directions, the stretcher was stopped and maintained in a position to hold the film under tension, and then cold water (15° C.) was poured into the pan until the film became totally immersed. In this manner the salt was extracted from the film while it was in its extended state. After about five minutes of extraction, the resulting stretched, partially extracted film was clamped in square frames to keep the film under tension, and thereby restrict dimensional change in the directions of stretch. The frames consisted of stainless steel squares made from strips of metal approximately one inch wide, and the films were held in place in the frames by means of clamps. The stretched film, clamped in this manner, was then extracted in cold water for 16 hours, and thereafter washed in relatively hot water (65° C.) for one hour. After extraction, excess water was removed from the surface of the films by blotting, and then the restrained film was dried in moving air for one hour at 130° C.

As controls, samples of the polymerized, salt-containing film were given the following treatments. In Control A, the unstretched salt-containing film was washed and dried under tension. In Control B, the unstretched salt-containing film was washed and dried under no tension. In Control C, the washed unstretched film of Control A was stretched simultaneously in two directions. The film was kept immersed in hot water during stretching to facilitate stretching. After being stretched, the film was dried.

As a fourth control, Control D, a film was prepared starting with the acrylonitrile polymer instead of the monomer using the following procedure. The following ingredients were stirred together, then ball milled 24 hours using stainless steel balls in reinforced porcelain mill jar:

| | Grams |
|---|---|
| Acrylonitrile polymer | 106.1 |
| Sodium thiocyanate | 88.1 |
| Distilled water | 200 |

The resulting dispersion was sandmilled twice and then degassed by stirring while in a vacuum. Films were cast using a 50 mil doctor knife. The first set were air dried at about 23° C. overnight. The resulting films were quite weak and were not capable of being stretched to a substantial extent. Tests with an air oven indicated that better coalescence was obtained at elevated temperatures, preferably at about 50° C. A second set of films was then prepared by oven drying at 50° C. for about 4 hours, followed by equilibration with room air (24° C., ca. 50% R.H.) for 24 hours prior to machine stretching. An infrared test of the rubbery gel films indicated 55 mole percent water. The gel film composition at the time of stretching was therefore:

| | Mole percent |
|---|---|
| Acrylonitrile polymer | 30 |
| Sodium thiocyanate | 15 |
| Water | 55 |

The gel films were then machine stretched as in Example 1. It was found essentially impossible to stretch these films to above about 2× in both directions. Films were stretched 2 × 2 (clip to clip distance) as in Example 1 and extracted and dried just as in the example. The final film was somewhat hazy and its top surface was grainy compared to the shiny, clear film of the invention.

The physical properties of the control films are compared with those of the biaxially oriented final film of this example in the following table, Table XIV. The inherent viscosity of the polymer in all films was measured and found to fall between 5 and 9.

TABLE XIV

| Physical property | Example 42 | Control A | Control B | Control C | Control D |
|---|---|---|---|---|---|
| Tensile strength (p.s.i.) | 29,500 | 13,500 | 12,000 | 14,000 | 17,000 |
| Elongation (percent) | 55 | 2 | 2 | 2 | 85 |
| Initial tensile modulus (p.s.i.) | 850,000 | 725,000 | 700,000 | 770,000 | 750,000 |
| Pneumatic impact strength (kg.-cm./mil) | 5.2 | <1 | <1 | <1 | 1.5 |
| I.P.V. | 65 | 135 | 130 | 135 | 100 |

*Example 43*

In this example the limits for the operable compositions shown in FIGURE 3 were determined. A composition of acrylonitrile, sodium thiocyanate and water, the mole percentages of which are shown in Table XV, was mixed together at room temperature. To the mixture was added 1% by weight benzoin methyl ether, based on monomer content, as photoinitiator. The resulting mixture was then stirred at room temperature either until a homogeneous solution was obtained or until it was determined that more than one permanent phase had formed. Where more than one phase was thought to have formed, the stirring was carried out for a period of at least one hour to discarding the solution. In those cases in which a single liquid phase had formed, the resulting solution was then subjected to photopolymerization in glass cells as described above to form homogeneous, coalesced salt- and water-containing polymeric films. It was found that the polymerization was 95% complete within the first 20 minutes. In order to insure complete polymerization, however, the irradiation was carried out for a period of 2 hours.

In order to determine the boundaries of the separation from one liquid phase to two liquid phases and from a liquid phase plus a solid phase to a single liquid phase, the following procedure was adopted. A mixture of monomer, salt and water was prepared which fell to the right of the line connecting points $D$ and $A$ shown on FIGURE 3 thus, corresponding to the presence of a solid phase in addition to the liquid phase. To this was added, by a method of water titration, small amounts of distilled water while the solution was stirred. The point at which the excess solid disappeared was noted and also the point at which two liquid phases appeared upon addition of still more water. The second point mentioned serves to define the line connecting points $E$ and $H$, which is the boundary between a single liquid phase and two liquid phases. The lines show connecting points $E$ and $D$ and points $H$ and $A$ on FIGURE 3 were determined to be lines corresponding to polymerized compositions having an ultimate elongation of 300% when the film is stretched in one direction. Thus, it may be seen that all points falling within the area bounded by the lines connecting points $A$, $D$, $E$ and $H$ correspond to compositions giving polymerized, salt-containing films having ultimate elongation of at least 300%. These films may be stretched to an extent of at least 1.5× in each direction, resulting in the production of biaxially oriented polyacrylonitrile films of outstanding durability and toughness.

The results for the homogeneous, polymerized, salt-containing films having inherent viscosities ranging from 5 to 12, after testing for elongation at room temperature (23° C.), are summarized in Table XV.

TABLE XV

| Test | Starting Composition (Mole % Monomer/Salt/Water) | Elongation (%) |
|---|---|---|
| A | 53.5/13.5/33 | 350. |
| B | 30/15/55 | 607. |
| C | 19/21/60 | 598. |
| D [1] | 65/25/10 | 213. |
| E [1] | 14/18/68 | 290. |
| F [1] | 0/23.7/76.3 | Liquid and solid phases. |
| G [1] | 21.9/21.9/56.2 | Boundary of solid phase separation |
| H [1] | 36.8/18.4/44.8 | Do. |
| I [1] | 59.8/15.0/25.2 | Do. |
| J [1] | 2.6/0/97.4 | Two separate liquid phases. |
| K [1] | 15/15/70 | Boundary of liquid phase separation. |
| L [1] | 27.6/13.8/58.6 | Do. |
| M [1] | 46/11/43 | Do. |
| N [1] | 90.6/0/9.4 | Two separate liquid phases. |

[1] Outside operable range of compositions.

*Examples 44–45*

In these examples is described the preparation of homogeneous, salt-containing polymerized films suitable for biaxially stretching to a high degree wherein the solvent metal salts are those given in Table XVI.

TABLE XVI

| Example: | Solvent metal salt |
|---|---|
| 44 | Potassium thiocyanate. |
| 45 | Lithium thiocyanate. |

Using a procedure essentially identical to that described in Example 43, a mixture was prepared from acrylonitrile monomer, salt and water in mole percentages 30/15/55. To this was added 1% benzoin methyl ether based on the weight of monomer. A polymerized salt-containing film was prepared from this solution by photopolymerization essentially as described in Example 43, using ultraviolet irradiation for 2 hours.

The resulting films were clear, tough, rubbery salt-containing films having ultimate elongations of at least 300%.

The process of this invention is useful in preparing shaped structures of acrylonitrile polymers having superior properties. The film may be used in such applications as a base support in magnetic recording films and tapes, as a dielectric in a wide variety of electrical applications, e.g., insulation in motors, transformers, wires, cables, capacitors, etc., as a base support for photographic film, as a plastic glazing material, as a construction material for containers, piping and bottle closures, as a packaging material, in metallic yarn, for various tapes, etc. The filaments may be made into yarns which can be used for both industrial and textile products. Such products include carpets, rugs, draperies, upholstery, tire cord, artificial down or hair substitutes and clothing materials of all varieties.

This application is a continuation-in-part of applications Serial No. 842,869, Serial No. 842,871 and Serial No. 842,873, all filed on September 28, 1959.

What is claimed is:

1. A process for preparing polymeric structures which comprises the steps, in sequence, of mixing 17–73 mole percent water, 5–35 mole percent of a halide selected from the group consisting of chlorides, bromides and iodides of calcium, zinc, strontium and cadmium and bromides and iodides of lithium, sodium and potassium and 15–70 mole percent of at least one polymerizable monomer, said monomer composed of 75–100% by weight of acrylonitrile and the remainder being an ethylenically unsaturated monomer copolymerizable with acrylonitrile, the mole percentages of the water, the halide and the monomer falling within the area ABCDEFG of FIGURE 1; polymerizing said monomer to form a halide-containing polymer; shaping said polymer into a structure; elongating said structure in at least one direction; washing the elongated structure essentially free of halide while holding said structure under tension; and, thereafter, drying the structure while holding said structure under tension.

2. A process for preparing polymeric film which comprises the steps, in sequence, of mixing 17–73 mole percent water, 5–35 mole percent of a halide selected from the group consisting of chlorides, bromides and iodides of calcium, zinc, strontium and cadmium and bromides and iodides of lithium, sodium and potassium and 15–70 mole percent of at least one polymerizable monomer, said monomer composed of 75–100% by weight of acrylonitrile and the remainder being an ethylenically unsaturated monomer copolymerizable with acrylonitrile, the mole percentages of the water, the halide and the monomer falling within the area ABCDEFG of FIGURE 1; polymerizing said monomer to form a halide-containing polymer; shaping said polymer into the form of a film; elongating the film at least 1.5× in at least one direction; washing the elongated film essentially free of the halide while holding the film under tension; and, thereafter, drying the film while holding it under tension.

3. A process as in claim 2 wherein the film is stretched at least 1.5× in two mutually perpendicular directions.

4. A process as in claim 2 wherein the halide is zinc chloride.

5. A process as in claim 2 wherein the halide is zinc bromide.

6. A process as in claim 2 wherein the halide is lithium bromide.

7. A process as in claim 2 wherein the monomer is composed of 100% by weight of acrylonitrile.

8. A process for preparing self-supporting polymeric film which comprises the steps, in sequence, of mixing 26–71 mole percent of water, 7–35 mole percent of a halide selected from the group consisting of chlorides, bromides and iodides of calcium, zinc, strontium and cadmium and bromides and iodides of lithium, sodium and potassium and 17–54 mole percent of at least one polymerizable monomer, said monomer composed of 75–100% by weight of acrylonitrile and the remainder being an ethylenically unsaturated monomer copolymerizable with acrylonitrile, the mole percentages of water, halide and monomer falling within the area ADE of FIGURE 1; polymerizing said monomer to form a halide-containing polymer; shaping said polymer into the form of a film; elongating the film at least 1.5× in at least one direction; washing the elongated film essentially free of the halide while holding the film under tension; and, thereafter, drying the film while holding it under tension.

9. A process as in claim 8 wherein said film is stretched at least 1.5× in two mutually perpendicular directions.

10. A process as in claim 8 wherein the halide is zinc bromide.

11. A process as in claim 8 wherein the halide is zinc chloride.

12. A continuous process for preparing a polymeric film which comprises the steps, in sequence, of mixing 17–73 mole percent of water, 5–35 mole percent of zinc chloride and 15–70 mole percent of acrylonitrile, the mole percentages of the three ingredients falling within the area ABCDEFG of FIGURE 1; polymerizing said acrylonitrile to form a zinc chloride-containing polyacrylonitrile; casting said zinc chloride-containing polyacrylonitrile in the form of a film; completing polymerization of the zinc chloride-containing polyacrylonitrile film; stretching said film in a direction transverse to its length at least 1.5 times its original width; stretching said one-way stretched film in the longitudinal direction at least 1.5 times its original length; washing the biaxially stretched film with water to remove essentially all of the zinc chloride while holding said biaxially stretched film under sufficient tension to prevent any substantial change in the dimensions of said film; and, thereafter, drying said film while holding it under tension.

13. A process for preparing polymeric structures which comprises the steps, in sequence, of mixing 24–73 mole percent water, 5–18.5 mole percent of calcium thiocyanate and 20–64 mole percent of at least one polymerizable monomer, said monomer composed of 75–100% by weight of acrylonitrile and the remainder being an ethylenically unsaturated monomer copolymerizable with acrylonitrile, the mole percentages of the water, the calcium thiocyanate and the monomer falling within the area ABCDEF of FIGURE 2; polymerizing said monomer to form a calcium thiocyanate-containing polymer; shaping said polymer into a structure; elongating said structure in at least one direction; washing the elongated structure essentially free of calcium thiocyanate while holding said structure under tension; and, thereafter, drying the structure while holding said structure under tension.

14. A process for preparing polymeric film which comprises the steps, in sequence, of mixing 24–73 mole percent water, 5–18.5 mole percent of calcium thiocyanate and 20–64 mole percent of at least one polymerizable monomer, said monomer composed of 75–100% by weight of acrylonitrile and the remainder being an ethylenically unsaturated monomer copolymerizable with acrylonitrile, the mole percentages of the water, the calcium thiocyanate and the monomer falling within the area ABCDEF of FIGURE 2; polymerizing said monomer to form a calcium thiocyanate-containing polymer; shaping said polymer into the form of a film; elongating the film at least 1.5× in at least one direction; washing the elongated film essentially free of calcium thiocyanate while holding the film under tension; and, thereafter, drying the film while holding it under tension.

15. A process as in claim 14 wherein the film is stretched at least 1.5× in two mutually perpendicular directions.

16. A process as in claim 14 wherein the monomer is composed of 100% by weight of acrylonitrile.

17. A process for preparing a self-supporting polymeric film which comprises the steps, in sequence, of mixing 24–45 mole percent of water, 5.5–18.5 mole percent of calcium thiocyanate and 24–60 mole percent of at least one polymerizable monomer, said monomer composed of 75–100% by weight of acrylonitrile and the remainder being an ethylenically unsaturated monomer copolymerizable with acrylonitrile, the mole percentages of water, calcium thiocyanate and monomer falling within the area of ABDE of FIGURE 2; polymerizing said monomer to form a calcium thiocyanate-containing polymer; shaping said polymer into the form of a film; elongating the film at least 1.5× in at least one direction; washing the elongated film essentially free of the calcium thiocyanate while holding the film under tension; and, thereafter, drying the film while holding it under tension.

18. A process as in claim 17 wherein said film is stretched at least 1.5× in two mutually perpendicular directions.

19. A continuous process for preparing a polymeric film which comprises the steps, in sequence, of mixing 24–73 mole percent of water, 5–18.5 mole percent of calcium thiocyanate and 20–64 mole percent of acrylonitrile, the mole percentages of the three ingredients falling within the area ABCDEF of FIGURE 2; polymerizing said acrylonitrile to form a calcium thiocyanate-containing polyacrylonitrile; casting said calcium thiocyanate-containing polyacrylonitrile in the form of a film; completing polymerization of the calcium thiocyanate-containing polyacrylonitrile film; stretching said film in a direction transverse to its length at least 1.5 times its original width; stretching said one-way stretched film in the longitudinal direction at least 1.5 times its original length; washing the biaxially stretched film with water to remove essentially all of the calcium thiocyanate while holding said biaxially stretched film under sufficient tension to prevent any substantial change in the dimensions of said film; and, thereafter, drying said film while holding it under tension.

20. A continuous process for preparing polymeric structures which comprises the steps, in sequence, of mixing 24–73 mole percent water, 5–18.5 mole percent calcium thiocyanate and 20-64 mole percent of at least one polymerizable monomer, said monomer composed of 75-100 percent by weight of acrylonitrile and the remainder being an ethylenically unsaturated monomer copolymerizable with acrylonitrile, the mole percentages of the water, the calcium thiocyanate and the monomer falling within the area ABCDEF of FIGURE 1; polymerizing said monomer to form a calcium thiocyanate-containing polymer; shaping said calcium thiocyanate-containing polymer into a structure; completing polymerization of the calcium thiocyanate-containing structure; elongating said structure in at least one direction; washing the elongated structure essentially free of calcium thiocyanate while holding said structure under tension; and thereafter, drying said structure while holding said structure under tension.

21. A process for preparing polymeric structures which comprises the steps, in sequence, of mixing 27.5-70 mole percent water, 8-23 mole percent of an alkali metal thiocyanate selected from the group consisting of lithium thiocyanate, sodium thiocyanate and potassium thiocyanate and 15-62 mole percent of at least one polymerizable monomer, said monomer composed of 75-100% by weight of acrylonitrile and the remainder being an ethylenically unsaturated monomer copolymerizable with acrylonitrile, the mole percentages of the water, the thiocyanates and the monomer falling within the area ABCDEFGH of FIGURE 3; polymerizing said monomer to form an alkali metal thiocyanate-containing polymer; shaping said alkali metal thiocyanate-containing polymer into a structure; elongating said structure in at least one direction; washing the elongated structure essentially free of alkali metal thiocyanate while holding said structure under tension; and, thereafter, drying the structure while holding said structure under tension.

22. A process for preparing polymeric film which comprises the steps, in sequence, of mixing 27.5-70 mole percent water, 8-23 mole percent of an alkali metal thiocyanate selected from the group consisting of lithium thiocyanate, sodium thiocyanate and potassium thiocyanate and 15-62 mole percent of at least one polymerizable monomer, said monomer composed of 75-100% by weight of acrylonitrile and the remainder being an ethylenically unsaturated monomer copolymerizable with acrylonitrile, the mole percentages of the water, the thiocyanate and the monomer falling within the area ABCDEFGH of FIGURE 3; polymerizing said monomer to form an alkali metal thiocyanate-containing polymer; shaping said alkali metal thiocyanate-containing polymer into the form of a film; elongating the film at least 1.5× in at least one direction; washing the elongated film essentially free of the alkali metal thiocyanate while holding the film under tension; and, thereafter, drying the film while holding it under tension.

23. A process as in claim 22 wherein the film is stretched at least 1.5× in two mutually perpendicular directions.

24. A process as in claim 22 wherein the alkali metal thiocyanate is sodium thiocyanate.

25. A process as in claim 22 wherein the alkali metal thiocyanate is potassium thiocyanate.

26. A process as in claim 22 wherein the alkali metal thiocyanate is lithium thiocyanate.

27. A process as in claim 22 wherein the monomer is composed of 100% by weight of acrylonitrile.

28. A process for preparing a self-supporting polymeric film which comprises the steps, in sequence, of mixing 33-68.5 mole percent of water, 9.5-22.5 mole percent of an alkali metal thiocyanate selected from the group consisting of lithium thiocyanate, sodium thiocyanate and potassium thiocyanate and 17-50 mole percent of at least one polymerizable monomer, said monomer composed of 75-100% by weight of acrylonitrile and the remainder being an ethylenically unsaturated monomer copolymerizable with acrylonitrile, the mole percentages of water, alkali metal thiocyanate and monomer falling within the area BCFG of FIGURE 3; polymerizing said monomer to form an alkali metal thiocyanate-containing polymer; shaping said alkali metal thiocyanate-containing polymer into the form of a film; elongating the film at least 1.5× in at least one direction; washing the elongated film essentially free of the alkali metal thiocyanate while holding the film under tension; and, thereafter, drying the film while holding it under tension.

29. A process as in claim 28 wherein said film is stretched at least 1.5× in two mutually perpendicular directions.

30. A process as in claim 28 wherein the alkali metal thiocyanate is sodium thiocyanate.

31. A continuous process for preparing a polymeric film which comprises the steps, in sequence, of mixing 27.5-70 mole percent of water, 8-23 mole percent of sodium thiocyanate and 15-62 mole percent of acrylonitrile, the mole percentages of the three ingredients falling within the area ABCDEFGH of FIGURE 3; polymerizing said acrylonitrile to form a sodium thiocyanate-containing polyacrylonitrile; casting said sodium thiocyanate-containing polyacrylonitrile in the form of a film; completing polymerization of the sodium thiocyanate-containing polyacrylonitrile film; stretching said film in a direction transverse to its length at least 1.5 times its original width; stretching said one-way stretched film in the longitudinal direction at least 1.5 times its original length; washing the biaxially stretched film with water to remove essentially all of the sodium thiocyanate while holding said biaxially stretched film under sufficient tension to prevent any substantial change in the dimensions of said film; and, thereafter, drying said film while holding it under tension.

32. A continuous process for preparing polymeric structures which comprises the steps, in sequence, of mixing 27.5-70 mole percent of water, 8-23 mole percent of an alkali metal thiocyanate selected from the group consisting of lithium thiocyanate, sodium thiocyanate and potassium thiocyanate and 15-62 mole percent of at least one polymerizable monomer, said monomer composed of 75-100 percent by weight of acrylonitrile and the remainder being an ethylenically unsaturated monomer copolymerizable with acrylonitrile, the mole percentages of the water, the thiocyanate and the monomer falling within the area ABCDEFGH of FIGURE 1; polymerizing said monomer to form an alkali metal thiocyanate-containing polymer; shaping said alkali metal thiocyanate-containing polymer into a structure; completing polymerization of the alkali metal thiocyanate-containing structure; elongating said structure in at least one direction; washing the elongated structure essentially free of alkali metal thiocyanate while holding said structure under tension; and, thereafter, drying said structure while holding said structure under tension.

References Cited in the file of this patent

UNITED STATES PATENTS

| | | |
|---|---|---|
| 2,140,921 | Rein | Dec. 20, 1938 |
| 2,558,730 | Cresswell | July 3, 1951 |
| 2,670,268 | Stanton et al. | Feb. 23, 1954 |
| 2,684,348 | Dietrich et al. | July 20, 1954 |
| 2,710,846 | Dietrich et al. | June 14, 1955 |
| 2,846,727 | Bechtold | Aug. 12, 1958 |
| 2,858,290 | Davis et al. | Oct. 28, 1958 |
| 3,015,858 | Hendricks | Jan. 9, 1962 |